United States Patent Office 3,428,635
Patented Feb. 18, 1969

3,428,635
SUBSTITUTED 1,4,5,6 - TETRAHYDRO - AS - TRIAZINES AND A METHOD FOR THEIR PRODUCTION
Donald L. Trepanier, Indianapolis, Ind., and Guy H. Harris, Concord, Calif., assignors to The Dow Chemical Company, Midland, Mich., a corporation of Delaware
No Drawing. Filed Dec. 5, 1966, Ser. No. 598,977
U.S. Cl. 260—248      8 Claims
Int. Cl. C07d 55/10, 109/04

The present invention is directed to new substituted 1,4,5,6-tetrahydro-as-triazines and their hydrochloride and hydrobromide salts and a method for their production. The new 1,4,5,6-tetrahydro-as-triazines of the present invention correspond to the formula

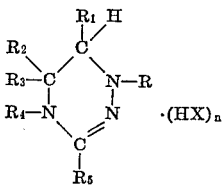

·(HX)ₙ

In this and succeeding formulae R represents hydrogen or methyl, $R_1$ independently represents hydrogen or methyl, $R_2$ independently represents hydrogen or methyl, $R_3$ independently represents methyl or phenyl, $R_4$ independently represents hydrogen, methyl or ethyl, $R_5$ represents lower alkyl, phenyl, halophenyl, halobenzyl, methoxy phenyl, pyridyl and halophenoxymethyl and when $R_4$ represents methyl or ethyl $R_3$ represents hydrogen, X represents chlorine or bromine and $n$ represents one of the integers 0 or 1.

In the present specification and claims, the term "halo" represents mono- or poly-halogen such as chlorine, bromine, fluorine and iodine and "lower alkyl" represents an alkyl moiety containing from 2 to 4 carbon atoms inclusive. Representative halophenyl, halobenzyl, methoxyphenyl and halophenoxymethyl moieties include: 4-fluorophenyl, 3,4-dibromophenyl, 3,4,5-trichlorophenyl, 2,4,5-tribromophenyl, 2,3,5-trichlorophenyl, 3,5-diiodophenyl, 2,6-dibromophenyl, 3,4-difluorobenzyl, 2,3,5-trichlorobenzyl, 3,4,5-tribromobenzyl, 2,3,4,5-tetrachlorobenzyl, 3,4,5-trimethoxyphenyl, 3-methoxyphenyl, 4-methoxyphenyl, 3,4-dimethoxyphenyl, 2,5-dimethoxyphenyl, 3,4,5-tribromophenoxymethyl, 3,5-difluorophenoxymethyl and 4-iodophenoxymethyl.

The 1,4,5,6-tetrahydro-as-triazines of the present invention, hereinafter referred to as tetrahydro-as-triazines, are liquid or solid materials which are of varying degrees of solubility in water and of moderate solubility in common organic solvents such as ether, benzene, chloroform and methylene chloride. The new compounds of the present invention have been found to be pharmacologically active in affecting the central nervous centers of high animals and in particular, in prolonging the hypnotic effects of barbiturates.

The compounds of the present invention corresponding to the formula

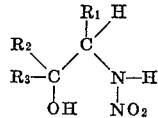

wherein R' represents phenyl, monochlorophenyl, monobromophenyl, monomethylphenyl, pyridyl, monofluorophenyl, m- or p-nitrophenyl, and m- or p-trifluoromethylphenyl, are prepared in accordance wtih a new method which comprises adding a substituted hydrazino alcohol, corresponding to the formula

to cold sulfuric acid and thereafter adding a nitrile corresponding to the formula

R'CN to the sulfuric acid-hydrazino alcohol mixture.

In the hydrazino alcohols employed as starting materials in the sulfuric acid process of the present invention, when $R_2$ represents hydrogen $R_3$ represents phenyl.

The exothermic reaction proceeds readily with the production of the desired tetrahydro-as-triazine when the reactants are contacted together at a temperature of from −10° C. to 50° C. At such temperatures, the reaction proceeds very rapidly enabling the desired product to be separated from the reaction mixture within minutes after the contacting of the reactants is completed. However, the reaction mixture can be maintained at temperatures within the reaction temperature range up to about 30 hours without there being any substantial decrease in the yield of the desired product.

Optimum yields of the tetrahydro-as-triazine product are obtained when the nitrile and hydrazino alcohol reactants are employed in substantially equimolar proportions. Molar amounts of hydrazino alcohol substantially greater than a two fold excess with respect to the molar quantity of nitrile are undesirable as such excesses result in the production of large amounts of tar with attendant decreases in yield and difficulty in separating the desired tetrahydro-as-triazine product.

Following the reaction period, the reaction mixture is poured into ice water and the acidic aqueous mixture extracted with an inert organic solvent such as chloroform or methylene chloride. Thereafter, the acidic aqueous mixture is made basic with an alkali metal base and the basic aqueous mixture extracted with an inert organic solvent and the extract consisting of a solution of the triazine product in the organic solvent is separated from the aqueous material. Thereafter, the organic solvent solution of the tetrahydro-as-triazine is washed with water, dried and the solvent removed by fractional distillation to obtain an oily or solid residue.

In carrying out the new method of the present invention, the hydrazino alcohol in methylene chloride is added slowly with stirring to sulfuric acid preferably at a temperature of −10° to 30° C. Representative hydrazino alcohols include N-amino-(−)-ephedrine, N-amino-(+)-pseudoephedrine, 1-methylhydrazino-t-butyl alcohol, α-(hydrazinomethyl)-α-methylbenzyl alcohol, α-(1-hydrazinoethyl)α-methylbenzyl alcohol and α(-1-methylhydrazinomethyl)benzyl alcohol. N-amino ephedrine and N-amino pseudoephedrine when employed as starting materials in the present method give the same 1,6-dimethyl substituted 1,4,5,6-tetrahydro-as-triazine products. Thereafter the stirring is continued and the nitrile is added to the stirred sulfuric acid-hydrazino alcohol mixture. In a preferred procedure the nitrile is added rapidly to the sulfuric acid-hydrazino alcohol mixture. During the addition of the nitrile to the sulfuric acid-hydrazino alcohol mixture, the reaction mixture can be cooled by conventional techniques in order to maintain the temperature of the exothermic reaction within the reaction temperature range. Following the addition of the nitrile, and preferably within from minutes to several hours, the acidic reaction mixture is poured into ice water. The acidic aqueous mixture thus formed is then extracted with chloroform or methylene chloride to remove any reaction by-product which may have precipitated in the aqueous mixture. Thereafter, the extracted acidic aqueous mixture is made basic with an alkali metal base. In a preferred procedure, the acidic aqueous mixture is poured into a cold aqueous solution of alkali metal base. Representative alkali metal bases include sodium hydroxide, potassium hydroxide, sodium carbonate, potassium carbonate and the like. The basic aqueous solution is thereafter extracted with an inert organic solvent and the tetrahydro-as-triazine-containing solvent washed, dried over a deliquescent material such as sodium sulfate and the solvent removed by conventional procedures.

The following examples are merely illustrative and are not intended to be limiting.

Example 1

N-amino-ephedrine (36 grams) was dissolved in 70 milliliters of methylene chloride and the resulting solution dried over sodium sulfate. The dried solution was then added slowly dropwise with stirring to 250 milliliters of concentrated sulfuric acid which had been cooled to 7° C. The methylene chloride solution of N-amino-ephedrine was added at such a rate and with cooling so as to prevent the temperature of the reaction mixture from going above 10° C. To the solution thus formed was added m-tolunitrile (23.4 grams) and the reaction mixture was stirred at 5° C. for 1 hour and thereafter, at room temperature overnight. Following the reaction period, the reaction mixture was poured onto 500 grams of ice. The ice mixture was diluted with 200 milliliters of water and extracted three times with methylene chloride. The aqueous acid layer was then neutralized by pouring it on sodium carbonate (500 grams). During the neutralization procedure, a solid material precipitated in the mixture. The solid material was separated by filtration and recrystallized from an isopropanol-water mixture. The crystals of the 1,6-dimethyl-3-(m-tolyl)-5-phenyl-1,4,5,6-tetrahydro-as-triazine product thus obtained were washed with isopropanol and found to melt at 147°–148° C.

Example 2

N-amino-ephedrine (36 grams; 0.2 mole) was dissolved in 50 milliliters of methylene chloride and the resulting solution dried over sodium sulfate. The dried solution was then added slowly dropwise with stirring to 250 milliliters of concentrated sulfuric acid. During the addition of the N-amino-ephedrine solution the temperature of the sulfuric acid solution was maintained at about 30° C. Thereafter, nicotinonitrile (20.8 grams; 0.2 mole) was added with stirring to the sulfuric acid-ephedrine solution. The reaction mixture thus prepared was stirred at room temperature overnight. Following the stirring period, the reaction mixture was poured onto 750 grams of ice and the aqueous mixture extracted three times with chloroform and the chloroform extracted discarded. Following the extraction, the acidic aqueous layer was made basic with excess sodium carbonate and the basic aqueous phase extracted four times with chloroform. The latter chloroform extract was then dried over sodium sulfate and concentrated to obtain an oil which crystallized upon standing for 2 days. The crystalline material was dissolved in benzene and chromatographed on 250 milliliters of acid-washed alumina. The desired product was eluted from the column with benzene. Thereafter, the benzene was removed by evaporation to leave a crystalline solid residue which was recrystallized from isopropanol to give the 1,6-dimethyl-3-(β-pyridyl)-5-phenyl-1,4,5,6-tetrahydro-as-triazine product as a crystalline solid material melting at 146°–147° C.

Other compounds of the present invention are prepared according to the methods previously set forth by carrying out reactions in concentrated sulfuric acid as follows:

1,6-dimethyl-3-(p-chlorophenyl)-5-phenyl-1,4,5,6-tetrahydro-as-triazine (melting at 132°–133° C.) by reacting together N-amino-ephedrine and p-chlorobenzonitrile.

1,6-dimethyl-3-(p-methoxyphenyl)-5-phenyl-1,4,5,6-tetrahydro-as-triazine (melting at 133°–134° C.) by reacting together N-amino-ephedrine and p-methoxybenzonitrile.

1,6-dimethyl-3,5-diphenyl-1,4,5,6-tetrahydro-as-triazine (melting at 146°–147° C.) by reacting together N-amino-ephedrine and benzonitrile.

1,6-dimethyl-3,5-diphenyl-1,4,5,6-tetrahydro-as-triazine (melting at 146°–147° C.) by reacting together N-amino pseudoephedrine and benzonitrile.

1,6-dimethyl-3-(o-chlorophenyl)-5-phenyl-1,4-5,6-tetrahydro-as-triazine (molecular weight 300.77) by reacting together N-amino-ephedrine and o-chlorobenzonitrile.

1,6-dimethyl-3-(p-tolyl)-5-phenyl-1,4,5,6-tetrahydro-as-triazine (melting at 142°–143° C.) by reacting together N-amino-ephedrine and p-tolunitrile.

1,6-dimethyl-3-(o-tolyl)-5-phenyl-1,4,5,6-tetrahydro-as-triazine (molecular weight 296.35) by reacting together N-amino-ephedrine and o-tolunitrile.

The compounds of the present invention corresponding to the formula

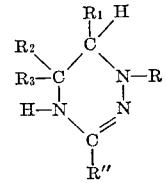

wherein R″ represents lower alkyl are prepared by a new method described and claimed in a copending application Ser. No. 598,940 filed concurrently herewith. Representative lower alkyl moieties include ethyl, propyl, and butyl. In such new method, a hydrazino alcohol corresponding to the formula

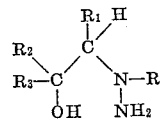

is dissolved in an inert organic solvent and the resulting solvent solution added slowly portion-wise to a cold concentrated sulfuric acid solution containing a nitrile compound corresponding to the formula

The exothermic reaction proceeds rapidly at temperatures between —10° C. to 50° C. with production of the desired product. Optimum yields of the desired product are obtained by contacting the reactants in substantially equimolar proportions and the use of substantially equimolar proportions is preferred.

In carrying out this method of producing the new compounds of the present invention, it is critical and essential that the solution of hydrazino alcohol in an inert organic solvent be added to the solution of the nitrile in sulfuric acid. Representative inert solvents in which the hydrazino alcohol is dissolved include methylene chloride, chloroform, ether and carbon tetrachloride. Following the reaction period the reaction is terminated by pouring the reaction mixture into cold water or ice. The acidic aqeous mixture thus formed is thereafter made basic by the addition of an alkali metal base such as sodium carbonate, sodium hydroxide or potassium hydroxide. Thereafter the tetrahydro-as-triazine product is separated from the basic aqueous mixture by extraction with a common organic solvent such as chloroform, methylene chloride, ether or benzene. The tetrahydro-as-triazine product is isolated from the extraction solvent by a convenient procedure such as distillation of the reaction solvent to remove the low boiling substituents and obtain the product as a residue or fractional crystallization.

EXAMPLE 4

Propio-nitrile (45 grams; 0.5 mole) is dissolved in 200 milliliters of concentrated sulfuric acid and the resulting solution stirred and cooled to 10° C. Thereafter, a solution of 1-methylhydrazino-t-butyl alcohol (23.6 grams; 0.2 mole) in 10 milliliters of methylene chloride was added dropwise over a 1½ hour period. During the addition of the hydrazino alcohol the temperature of the reaction mixture is maintained at between 10° and 20° C. Following the contacting of the reactants the reaction mixture is poured onto 500 grams of ice and the resulting aqueous mixture neutralized with sodium carbonate. Following the neutralization sodium hydroxide is added to the neutralized mixture to make it more basic (pH about 11). The basic mixture is thereafter extracted 4 times with ether and the combined ether layers dried over sodium sulfate and concentrated to obtain an oily residue. The oily residue is fractionally distilled to remove the low boiling constituent and obtain a crystalline solid residue. This crystalline residue is thereafter 4 times recrystallized from methylene chloride and petroleum ether to obtain the 3 - ethyl-1,5,5-trimethyl-1,4,5,6-tetrahydro-as-triazine product (molecular weight 156.25).

In a similar procedure, the following compounds of the present invention are prepared.

1,3 - dimethyl - 5-phenyl-1,4,5,6-tetrahydro-as-triazine (melting at 84°–85° C.) by reacting together α-(1-methylhydrazinomethyl)benzyl alcohol and acetonitrile.

1,5- - dimethyl - 3-propyl-1,4,5,6-tetrahydro-as-triazine (molecular weight 154.20) by reacting together 1-(1-methylhydrazino)-2-propanol and butyronitrile.

3,5 - diphenyl - 1-methyl-1,4,5,6-tetrahydro-as-triazine (melting at 133°–134° C.) by reacting together α-(1-methylhydrazinomethyl)benzyl alcohol and benzonitrile.

1,5,5 - trimethyl-3-phenyl-1,4,5,6-tetrahydro-as-triazine (melting at 95°–96° C.) by reacting together benzonitrile and 1-methylhydrazino-t-butyl alcohol.

1-methyl - 3 - (o-chlorophenyl)-5-phenyl-1,4,5,6-tetrahydro-as-triazine (melting at 92°–93° C.) by reacting together o-chlorobenzonitrile and α-(1-methylhydrazinomethyl)benzyl alcohol.

1 - methyl-3-(p-methoxyphenyl)-5-phenyl-1,4,5,6-tetrahydro-as-triazine (melting at 103°–105° C.) by reacting together p-methoxybenzonitrile and α-(1-methylhydrazinomethyl)benzyl alcohol.

1 - methyl-3-(p-trifluoromethylphenyl)-5-phenyl-1,4,5,6-tetrahydro-as-triazine (melting at 80°–83° C.) by reacting together p-trifluoromethylbenzonitrile and α-(1-methylhydrazinomethyl)benzyl alcohol.

1-methyl - 3 - (p-chlorophenyl)-5-phenyl-1,4,5,6-tetrahydro-as-triazine (melting at 107°–108° C.) by reacting together p-chlorobenzonitrile and α-(1-methylhydrazinomethyl)benzyl alcohol.

5 - methyl - 5 - phenyl-3-phenyl-1,4,5,6-tetrahydro-as-triazine (molecular weight 252.30) by reacting together benzonitrile and α-(1-methylhydrazinomethyl)-α-methylbenzyl alcohol.

5,6-dimethyl - 5 - phenyl-3-(4-trifluoromethylphenyl) 1,4,5,6-tetrahydro-as-triazine (molecular weight 334.22) by reacting together 4-(trifluoromethyl)benzonitrile and α-(1-hydrazinoethyl)-α-methylbenzyl alcohol.

1,6-dimethyl-3-(p-trifluoromethylphenyl) - 5 - phenyl-1,4,5,6-tetrahydro-as-triazine (melting at 119°–120° C.) by reacting together p-trifluoromethylbenzonitrile and N-amino-ephedrine.

1,6-dimethyl - 3 - (p-fluorophenyl)-5-phenyl-1,4,5,6-tetrahydro-as-triazine (melting at 118°–121° C.) by reacting N-amino-ephedrine with p-fluorobenzonitrile.

1,6 - dimethyl - 3 - (p-nitrophenyl)-5-phenyl-1,4,5,6-tetrahydro-as-triazine (melting at 110°–111° C.) by reacting N-amino-ephedrine with p-nitrobenzonitrile.

The new 1,4,5,6-tetrahydro-as-triazine compounds of the present invention corresponding to the formula

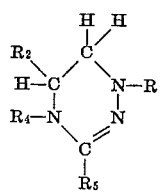

are prepared by a new process which is claimed in a copending application, Ser. No. 598,894, filed concurrently herewith. In said process a β-aminoalkyl hydrazine corresponding to the formula $$R_4-NH-\overset{R_2}{\underset{|}{C}}H-CH_2-\overset{R}{\underset{|}{N}}-NH_2$$

is reacted with a methyl or ethyl imino ester hydrohalide corresponding to the formula

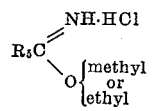

The slightly exothermic reaction is conveniently carried out in the presence of an inert organic solvent as reaction medium. The reaction proceeds readily at temperatures of from about 50° to 200° C. In a convenient procedure the reaction is carried out at the boiling temperature of the reaction mixture and under reflux. The reaction proceeds readily with the production of the desired product when the reactants are contacted in any proportions. However, optimum yields are obtained when the reactants are blended and heated in substantially equimolar proportions.

In this method, the reactants are contacted in any order or fashion and the temperature of the resulting reaction mixture maintained in the reaction temperature zone for a short period of time. Following the reaction period, the reaction mixture is distilled to obtain the desired product as a residue and the residue is dissolved in an aqueous mineral acid. Representative mineral acids include hydrochloric, sulfuric and hydrobromic acid. The acidic mixture is thereafter extracted with an organic solvent such as chloroform or methylene chloride. Following the extraction procedure, the acidic aqueous portion is made basic by the addition of an alkali metal base. The tetrahydro-as-triazine product is thereafter extracted from the basic aqueous mixture with an organic solvent such as methylene chloride, diethyl ether, benzene, toluene or chloroform. The tetrahydro-as-triazine product is isolated from the extraction solvent and worked up as set forth above.

Example 5

Ethyl p-chlorophenylacetimidate hydrochloride was dispersed in 300 milliliters of absolute ethanol. To this mixture was added slowly dropwise a solution of 1-(β-ethylaminoethyl)-1-methyl hydrazine (11.7 grams; 0.10 mole) in 50 milliliters of ethanol. The resulting mixture was heated at the boiling temperature and under reflux for 20 hours. Following the heating period the reaction mixture was concentrated under reduced pressure, dissolved in aqueous 5 percent hydrochloric acid, washed with chloroform and the pH of the reaction mixture raised to pH 12 by the addition of 10 N sodium hydroxide solution. The basic reaction mixture was extracted with chloroform and the chloroform extracts concentrated to give a viscous orange liquid which crystallized upon standing. The crystals were removed by filtration and the filtrate mixed with acetone and cooled to give a second crop of crystals. The crystals were combined and recrystallized from acetone to give the 3-(p-chlorobenzyl)-4-ethyl-1-methyl-1,4,5,6-tetrahydro-as-triazine product melting at 62.4°–64° C.

The following compounds of the present invention are prepared in a similar fashion.

1 - methyl-3-phenyl-1,4,5,6-tetrahydro-as-triazine, melting point 88°–89° C., by reacting together methyl benzimidate hydrochloride and 1-(2-aminoethyl)-1-methylhydrazine in chloroform.

1 - methyl-3-(2,3,6-trichlorobenzyl)-1,4,5,6-tetrahydro-as-triazine, melting point 167°–168° C., by reacting together ethyl 2,3,6-trichlorophenylacetimidate hydrochloride and 1-methyl-β-aminoethyl hydrazine in ethanol.

1,5-dimethyl - 3 - (2,3,6-trichlorobenzyl)-1,4,5,6-tetrahydro-as-triazine, melting point 161°–163° C. by reacting together ethyl 2,3,6-trichlorophenylacetimidate hydrochloride and 1-(2-aminopropyl)-1-methylhydrazine in ethanol.

3 - (2,6 - dichlorobenzyl)-1,4,5,6-tetrahydro-as-triazine, melting point 159°–160° C., by reacting together ethyl 2,6-dichlorophenylacetimidate hydrochloride and 2-aminoethylhydrazine in ethanol.

1 - methyl-3-(2,6-dichlorobenzyl) - 1,4,5,6-tetrahydro-as-triazine, melting at 128°–130° C. by reacting together ethyl 2,6 - dichlorophenylacetimidate hydrochloride and 1-(2-aminoethyl)-1-methylhydrazine in ethanol.

1,5 - dimethyl-3-phenyl-1,4,5,6 - tetrahydro-as-triazine, boiling point 135°–137° C. under 0.8 millimeters of mercury pressure, by reacting togther methyl benzimidate hydrochloride and 1-(2-aminopropyl)-1-methylhydrazine in chloroform.

1,5 - dimethyl-3-(2,6-dichlorobenzyl) - 1,4,5,6-tetrahydro-as-triazine, melting point 158°–159° C., by reacting together ethyl 2,6-dichlorophenylacetimidate hydrochloride and 1-(2-aminopropyl)-1-methylhydrazine in ethanol.

3 - (3,4,5-trimethoxyphenyl) - 1,4,5,6 - tetrahydro-as-triazine, melting point 132°–132° C., by reacting together ethyl 3,4,5-trimethoxybenzimidate hydrochloride and 2-aminoethylhydrazine in ethanol.

1 - methyl-3-ethyl-1,4,5,6-tetrahydro-as-triazine, boiling point 80°–83° C. under 0.7 millimeters of mercury pressure, by reacting together ethyl propioimidate hydrochloride and 1-(2-aminoethyl)-1-methylhydrazine in ethanol.

3-(4-chlorophenyl)-1,4,5,6-tetrahydro-as-triazine, melting point 136–137° C., by reacting together ethyl 4-chlorobenzimidate hydrochloride and 2-aminoethyl hydrazine in ethanol.

1 - methyl-3-(4-chlorobenzyl) - 1,4,5,6-tetrahydro-as-triazine, melting point 133°–134° C., by reacting together ethyl 4-chlorophenylacetimidate hydrochloride and 1-(2-aminoethyl)-1-methylhydrazine in ethanol.

1,5-dimethyl-3-(3,4,5-trimethoxyphenyl) - 1,4,5,6-tetrahydro-as-trazine, melting point 148°–149° C. by reacting together ethyl 3,4,5-trimethoxybenzimidate hydrochloride and 1-(2-aminopropyl)-1-methylhydrazine in ethanol.

1- methyl-3-phenyl-4-ethyl - 1,4,5,6-tetrahydro-as-triazine, boiling point 118°–119° C. under 0.2 millimeter of mercury pressure, by reacting togther ethyl benzimidate hydrochloride and 1-(2-ethylaminoethyl)-1-methylhydrazine in ethanol.

1 - methyl-3-(4-chlorobenzyl) - 4-ethyl-1,4,5,6-tetrahydro-as-triazine, melting point 63°–64° C., by reacting together ethyl 4-chlorophenylacetimidate hydrochloride and 1-(2-ethylaminoethyl)-1-methylhydrazine in ethanol.

1 - methyl-3-(3,4-dichlorophenoxymethyl) - 1,4,5,6-tetrahydro-as-triazine, melting point 83°–85° C., by reacting together ethyl 3,4-dichlorophenoxyacetimidate hydrochloride and 1-(aminoethyl)-1-methylhydrazine in ethanol.

3 - (3,4-dichlorophenoxymethyl)-1,4,5,6-tetrahydro-as-triazine, molecular weight 230.08, by reacting together ethyl 3,4-dichlorophenoxyacetimidate hydrochloride and 2-aminoethyl hydrazine in ethanol.

1 - methyl-3-(4-pyridyl)-1,4,5,6 - tetrahydro-as-triazine, melting point 117°–118° C., by reacting together ethyl isonicotinimidate hydrochloride and 1-(2-aminoethyl)-1-methylhydrazine in ethanol.

1 - methyl-3-(4-pyridyl)-4-ethyl - 1,4,5,6-tetrahydro-as-triazine, boiling point 118° C. under 0.12 millimeters of mercury pressure, by reacting together ethyl isonicotinimidate hydrochloride and 1-(2-ethylaminoethyl)-1-methylhydrazine in ehtanol.

1,4 - dimethyl - 3 - (3,4-dimethoxybenzyl)-1,4,5,6-tetrahydro-as-triazine, melting point 152°–153° C., by reacting together ethyl 3,4-dimethoxyphenylacetimidate hydrochloride and 1-(2-methylaminoethyl)-1-methylhydrazine.

1 - methyl-3-(3,4-dimethylbenzyl) - 1,4,5,6-tetrahydro-as-triazine, melting at 129°–132° C., by reacting ethyl 3,4-dimethylphenylacetimidate and 1-(2-aminoethyl)-1-methylhydrazine in ethanol.

3 - (3,4-dimethoxybenzyl)-1,4,5,6 - tetrahydro-as-triazine, melting at 77°–79° C., by reacting togeher ethyl 3,4-dimethoxyphenylacetimidate and 2-aminoethyl hydrazine in ethanol.

The hydrochloride and hydrobromide salt compounds of the present invention are prepared by reacting a 1,4,5,6-tetrahydro-as-triazine corresponding to the formula

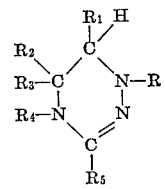

with hydrogen chloride or hydrogen bromide at room temperature. In a representative procedure, the 1,4,5,6-tetrahydro-as-triazine is dissolved in ether and hydrogen chloride or hydrogen bromide bubbled through the reaction mixture. In an alternative procedure, an ether solution saturated with hydrogen chloride or hydrogen bromide is added to the solution of 1,4,5,6-tetrahydro-as-triazine in ether. During the contacting of the reactants the product salt precipitates in the reaction mixture as a crystalline solid and is separated therefrom by such convenient procedures as filtration, decantation or centrifugation.

The following compounds of the present invention are prepared in accordance with the teachings of the preceding paragraph.

1,6 - dimethyl-3-(o-chlorophenyl)-5-phenyl-1,4,5,6-tetrahydro-as-triazine hydrochloride (melting at 256°–257° C.) by reacting together 1,6-dimethyl-3-(o-chlorophenyl)-5-phenyl-1,4,5,6-tetrahydro-as-triazine and hydrogen chloride.

1,6 - dimethyl - 3-(o-tolyl)-5-phenyl-1,4,5,6-tetrahydro-as-triazine hydrochloride (melting at 227°–229° C.) by reacting together 1,6-dimethyl-3-(o-tolyl)-1,4,5,-6-tetrahydro-as-triazine and hydrogen chloride.

1,5 - dimethyl-3-(o-chlorophenyl) - 1,4,5,6-tetrahydro-as-triazine hydrobromide (melting at 183°–185° C.) by reacting together 1,5-dimethyl-3-(1-chlorophenyl)-1,4,5,-6-tetrahydro-as-triazine and hydrogen bromide.

3 - (3,4-dichlorophenoxymethyl)-1,4,5,6-tetrahydro-as-triazine hydrochloride (melting at 223°–224° C., with decomposition) by reacting togther 3-(3,4-dichlorophenoxymethyl)-1,4,5,6-tetrahydro-as-triazine and hydrogen chloride.

1 - methyl-3-(3,4-dimethoxylbenzyl) - 1,4,5,6-tetrahydro-as-triazine hydrochloride (melting at 165°–168° C.) by reacting together 1-methyl-3-(3,4-dimethoxybenzyl)-1,4,5,6-tetrahydro-as-triazine and hydrogen chloride.

3 - (3,4 - dichlorophenoxymethyl)-1,5-dimethyl-1,4,5,6-tetrahydro-as-triazine hydrochloride (melting at 181°–183° C. with decomposition) by reacting together 3-(3,4-dichlorophenoxymethyl) - 1,5 - dimethyl-1,4,5,6-tetrahydro-as-triazine and hydrogen chloride.

The structures assigned to the new compounds of the present invention are confirmed by elemental analysis, infrared and ultraviolet spectra and nuclear magnetic resonance measurements.

To test for toxicity and to demonstrate the pharmacological activity of the tetrahydro-as-triazines, groups of 10 albino mice were injected intraperitoneally once daily on four successive days with an aqueous dispersion containing one of the tetrahydro-as-triazines as the sole active component. The active compound was administered at a dosage of 100 milligrams per kilogram of body weight per day. No gross signs of toxicity were observed in the injected mice. Two hours after the administration of the fourth dose of the tetrahydro-as-triazine compound each of the treated mice was given an intraperitoneal (i.p.) dose of hexobarbital at the rate of 100 milligrams per kilogram. In a check operation, 10 exactly similar mice, which had not received a tetrahydro-as-triazine compound were simultaneously dosed with hexobarbital at 100 milligrams per kilogram i.p. Within a few minutes after injection of the hexobarbital, all of the mice were asleep. Each mouse was placed on its back and the period of time from injection of the hexobarbital until the mouse purposely righted itself was recorded as the sleep time. The average sleep time for the mice in each treated group is set forth in the following table as a function of the average sleep time of the check animals. Thus, in the table the expression 4× means that the mice treated with the corresponding compound slept four times the average sleep time for the control mice, 7× means seven times and so on.

| Compound: | Increase in sleep time |
|---|---|
| 1,6 - dimethyl - 3-(p-methoxyphenyl)-5-phenyl-1,4,5,6-tetrahydro-as-triazine | 4× |
| 1,6 - dimethyl-3-(o-chlorophenyl)-5-phenyl-1,4,5,6-tetrahydro-as-triazine hydrochloride | 7× |
| 1,6 - dimethyl - 3 - (m-tolyl)-5-phenyl-1,4,5,6-tetra-hydro-as-triazine | 4× |
| 1,6 - dimethyl-3-(p-tolyl)-5-phenyl-1,4,5,6-tetra-hydro-as-triazine | 5× |
| 1,6 - dimethyl-3-(o-tolyl)-5-phenyl-1,4,5,6-tetra-hydro-as-triazine hydrochloride | 7× |
| 1,6 - dimethyl - 3-(3-pyridyl)-5-phenyl-1,4,5,6-tetrahydro-as-triazine | 6× |
| 1,5,5 - trimethyl-3-phenyl-1,4,5,6-tetrahydro-as-triazine | 3× |
| 1,6 - dimethyl - 3-(p-trifluoromethyl-phenyl)-4-phenyl-1,4,5,6-tetrahydro-as-triazine | 5× |
| 1,6 - dimethyl-3-(p-fluorophenyl)-5-phenyl-1,4,5,6-tetrahydro-as-triazine | 4× |
| 1-methyl-3-(2,3,6-trichlorobenzyl)-1,4,5,6-tetra-hydro-as-triazine | 3× |
| 1 - methyl - 3-phenyl-4-ethyl-1,4,5,6-tetrahydro-as-triazine | 3× |
| 1 - methyl - 3-(4-chlorobenzyl)-4-ethyl-1,4,5,6-tetrahydro-as-triazine [1] | 3.5× |
| 1,5 - dimethyl-3-(3,4-dichlorophenoxymethylene)-1,4,5,6-tetrahydro-as-triazine | 3.5× |
| 1 - methyl-3-(4-pyridyl)-4-ethyl-1,4,5,6-tetra-hydro-as-triazine [2] | 8.8× |

[1] Compound employed at dosage of 25 mg./kg.
[2] Compound employed at dosage of 200 mg./kg.

In a standard pharmacological test, 3-ethyl-1,4,5,6-tetrahydro - as-triazine, 3-(4-chlorophenyl)-1,4,5,6-tetra-hydro-as-triazine, and 3-(4-chlorobenzyl)-1,4,5,6-tetrahydro-as-triazine each when injected into mice in a single dose of 20 mg./kg. give good protection against the affects of hyperexcitability induced by the injection of a large dose of d-amphetamine sulfate.

The β-aminoalkylhydrazines employed as starting materials in the present invention are prepared in accordance with known techniques. In such procedures hydrazine or methyl hydrazine is contacted with aziridine, propylene-imine or an N-alkylaziridine corresponding to the formula

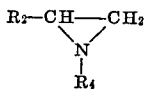

in the presence of a catalytic amount of ammonium chloride. The reaction mixture is heated at the boiling temperature and under reflux for about 24 hours. Thereafter the excess hydrazine is distilled off and the product separated by fractional distillation.

The β-(1-methylhydrazino)ethanols corresponding to the formula

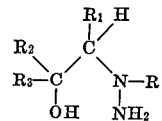

and employed as starting materials in the present invention are prepared by known techniques. In such procedures, an epoxide corresponding to the formula

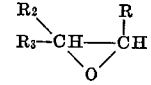

is added dropwise to a heated mixture of about a 10 molar excess of R—NH—NH$_2$ in the presence of a catalytic amount of sodium hydroxide. The reaction mixture is heated at the boiling temperature and under reflux for about 18–30 hours. Thereafter, the desired product is separated by distillation.

The imino ester hydrochlorides are prepared by the Pinner synthesis (Roger, R. and Neilson, D.G., Chem. Revs., 61, 179 (1961)) which consists of condensing the nitrile and the alcohol under anhydrous conditions in the presence of hydrogen chloride at 0°–5° C.

We claim:
1. A 1,4,5,6-tetrahydro-as-triazine corresponding to the formula

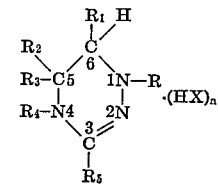

wherein R represents hydrogen or methyl, $R_1$ independently represents hydrogen or methyl, $R_2$ independently represents hydrogen or methyl, $R_3$ independently represents hydrogen, methyl, or phenyl, $R_4$ independently represents hydrogen, methyl or ethyl, and when $R_4$ represents methyl or ethyl $R_3$ represents hydrogen, $R_5$ represents lower alkyl, phenyl, halophenyl, halobenzyl, methoxyphenyl, pyridyl or halophenoxymethyl, X represents chlorine or bromine and $n$ represents one of the integers 0 or 1.

2. The method of producing a 1,4,5,6-tetrahydro-as-triazine corresponding to the formula

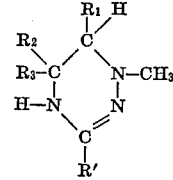

wherein $R_1$ independently represents hydrogen or methyl, $R_2$ independently represents hydrogen or methyl, $R_3$ independently represents hydrogen, methyl or phenyl, R' represents phenyl, monochlorophenyl, monobromophenyl, pyridyl, monofluorophenyl, or trifluoromethylphenyl and when $R_2$ represents hydrogen $R_3$ represents phenyl; wherein said method comprises adding a substituted β-(1-methylhydrazino)ethanol corresponding to the formula

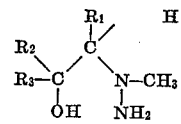

in which $R_1$, $R_2$, and $R_3$ have the previously defined significance, to cold sulfuric acid and thereafter adding to the mixture of sulfuric acid and substituted β-(1-methylhydrazino)ethanol a nitrile corresponding the formula

R′CN wherein R′ has the previously defined significance.

3. The compound claimed in claim 1 wherein the 1,4,5,6 - tetrahydro-as-triazine is 1,6-dimethyl-3-(o-chlorophenyl) - 5-phenyl-1,4,5,6-tetrahydro-as-triazine hydrochloride.

4. The compound claimed in claim 1 wherein the 1,4,5,6 - tetrahydro-as-triazine is 3-(p-chlorobenzyl)-1-methyl-1,4,5,6-tetrahydro-as-triazine.

5. The compound claimed in claim 1 wherein the 1,4,5,6-tetrahydro-as-triazine is 1-methyl-3-(2,3,6-trichlorobenzyl)-1,4,5,6-tetrahydro-as-triazine.

6. The compound claimed in claim 1 wherein the 1,4,5,6-tetrahydro-as-triazine is 1-methyl-3-(4-pyridyl)-4-ethyl-1,4,5,6-tetrahydro-as-triazine.

7. The compound claimed in claim 1 wherein the 1,4,5,6-tetrahydro-as-triazine is 1,6 - dimethyl-3-(o-tolyl)-5-phenyl-1,4,5,6-tetrahydro-as-triazine hydrochloride.

8. The compound claimed in claim 1 wherein the 1,4,5,6-tetrahydro-as-triazine is 1,6-dimethyl - 3 - (β-pyridyl)-5-phenyl-1,4,5,6-tetrahydro-as-triazine.

References Cited
UNITED STATES PATENTS 3,021,328    2/1962    Morin et al.    260—248
3,135,737    6/1964    Restivo    260—248 XR HENRY R. JILES, *Primary Examiner.*

J. M. FORD, *Assistant Examiner.*

U.S. Cl. X.R.

167—65; 260—584, 569, 583

UNITED STATES PATENT OFFICE
CERTIFICATE OF CORRECTION

Patent No. 3,428,635            February 18, 1969

Donald L. Trepanier et al.

It is certified that error appears in the above identified patent and that said Letters Patent are hereby corrected as shown below:

Column 1, line 27, after "represents" insert -- hydrogen, --; lines 60 to 68, the formula should appear as shown below:

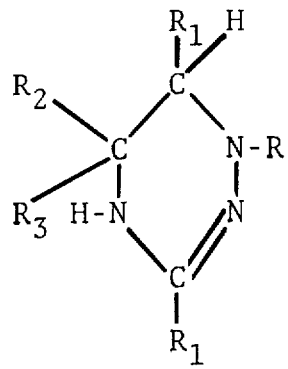

Column 2, lines 3 to 7, the formula should appear as shown below:

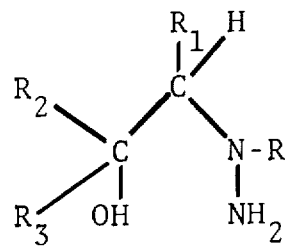

Column 7, line 30, "132°-132° C." should read -- 132°-133° C. --. Column 10, lines 15 to 18, the formula should appear as shown below:

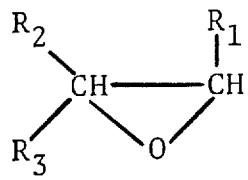

Signed and sealed this 31st day of March 1970.

(SEAL)
Attest:

EDWARD M. FLETCHER, JR.          WILLIAM E. SCHUYLER, JR.
Attesting Officer                     Commissioner of Patents